United States Patent
Sorenson et al.

(10) Patent No.: US 8,397,586 B2
(45) Date of Patent: *Mar. 19, 2013

(54) FLOW SENSOR ASSEMBLY WITH POROUS INSERT

(75) Inventors: Richard C. Sorenson, Columbus, OH (US); Mohammad Abdul Javvad Qasimi, Hilliard, OH (US); Jamie Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/729,145

(22) Filed: Mar. 22, 2010

(65) Prior Publication Data

US 2011/0226053 A1     Sep. 22, 2011

(51) Int. Cl.
*G01F 1/37* (2006.01)
*G01F 1/68* (2006.01)
(52) U.S. Cl. .................................. 73/861.52; 73/202.5
(58) Field of Classification Search .................. None
See application file for complete search history.

(56) References Cited

U.S. PATENT DOCUMENTS

| | | | |
|---|---|---|---|
| 2,746,296 A | 5/1956 | Stover | |
| 3,216,249 A | 11/1965 | Joel | |
| 3,410,287 A | 11/1968 | Van Der Heyden et al. | |
| 3,433,069 A | 3/1969 | Trageser | |
| 3,559,482 A | 2/1971 | Baker et al. | |
| 3,640,277 A | 2/1972 | Adelberg | |
| 3,785,206 A | 1/1974 | Benson et al. | |
| 3,830,104 A | 8/1974 | Gau | |
| 3,838,598 A | 10/1974 | Tompkins | |
| 3,895,531 A | 7/1975 | Lambert | |

(Continued)

FOREIGN PATENT DOCUMENTS

| | | |
|---|---|---|
| DE | 3905746 | 8/1990 |
| DE | 102004019521 | 11/2005 |

(Continued)

OTHER PUBLICATIONS

Honeywell, "Airflow, Force, and Pressure Sensors," Product Range Guide, 20 pages, Apr. 2010.

(Continued)

*Primary Examiner* — Harshad R Patel
(74) *Attorney, Agent, or Firm* — Seager Tufte & Wickhem LLC.

(57) ABSTRACT

The present disclosure relates generally to flow sensors, and more particularly, to methods and devices for reducing variations in fluid flow across the flow sensor for increased accuracy and/or reliability. In one illustrative embodiment, a flow sensor assembly includes a housing with an inlet flow port and an outlet flow port. The housing defines a fluid channel extending between the inlet flow port and the outlet flow port, with a flow sensor positioned in the housing and exposed to the fluid channel. The flow sensor is configured to sense a measure related to the flow rate of a fluid flowing through the fluid channel. A porous insert is situated in the fluid channel, sometimes upstream of the flow sensor. When so configured, and during operation of the flow sensor assembly, a fluid may pass through the inlet flow port, through the porous insert, across the flow sensor, and through the outlet flow port. The porous insert may include pores that are configured to reduce the turbulence in the fluid passing the flow sensor.

13 Claims, 8 Drawing Sheets

U.S. PATENT DOCUMENTS

| | | |
|---|---|---|
| 3,952,577 A | 4/1976 | Hayes et al. |
| 3,981,074 A | 9/1976 | Yamamoto et al. |
| 4,030,357 A | 6/1977 | Wemyss |
| 4,041,757 A | 8/1977 | Baker et al. |
| 4,100,801 A | 7/1978 | LeMay |
| 4,326,214 A | 4/1982 | Trueblood |
| 4,343,194 A | 8/1982 | Dehart et al. |
| 4,411,292 A | 10/1983 | Schiller |
| 4,418,723 A | 12/1983 | Koni et al. |
| 4,444,060 A | 4/1984 | Yamamoto |
| RE31,570 E | 5/1984 | Drexel |
| 4,478,076 A | 10/1984 | Bohrer |
| 4,478,077 A | 10/1984 | Bohrer et al. |
| 4,481,828 A | 11/1984 | Cheng |
| 4,494,405 A | 1/1985 | Oosuga et al. |
| 4,501,144 A | 2/1985 | Higashi et al. |
| 4,546,655 A | 10/1985 | Victor |
| 4,581,945 A | 4/1986 | Rusz |
| 4,648,270 A | 3/1987 | Johnson et al. |
| 4,653,321 A | 3/1987 | Cunningham et al. |
| 4,655,088 A | 4/1987 | Adams |
| 4,668,102 A | 5/1987 | Mott |
| 4,672,997 A | 6/1987 | Landis et al. |
| 4,677,858 A | 7/1987 | Ohnhaus |
| 4,696,194 A | 9/1987 | Taylor |
| 4,768,386 A | 9/1988 | Taddeo |
| 4,790,181 A | 12/1988 | Aine |
| 4,800,754 A | 1/1989 | Korpi |
| 4,825,704 A | 5/1989 | Aoshima et al. |
| 4,829,818 A | 5/1989 | Bohrer |
| 4,839,038 A | 6/1989 | McLain, II |
| 4,856,328 A | 8/1989 | Johnson |
| 4,900,242 A | 2/1990 | Maus et al. |
| 4,961,344 A | 10/1990 | Rodder |
| 4,976,283 A | 12/1990 | Wildfang et al. |
| 5,000,478 A | 3/1991 | Kerastas |
| 5,050,429 A | 9/1991 | Nishimoto et al. |
| 5,063,786 A | 11/1991 | Sanderson et al. |
| 5,063,787 A | 11/1991 | Khuzai et al. |
| 5,081,866 A | 1/1992 | Ochiai et al. |
| 5,088,332 A | 2/1992 | Merilainen et al. |
| 5,107,441 A | 4/1992 | Decker |
| 5,161,410 A | 11/1992 | Davey et al. |
| 5,220,830 A * | 6/1993 | Bonne ................ 73/204.21 |
| 5,231,877 A | 8/1993 | Henderson |
| 5,249,462 A * | 10/1993 | Bonne ................ 73/204.21 |
| 5,253,517 A | 10/1993 | Molin et al. |
| 5,295,394 A | 3/1994 | Suzuki |
| 5,303,584 A | 4/1994 | Ogasawara et al. |
| 5,319,973 A | 6/1994 | Crayton et al. |
| 5,332,005 A | 7/1994 | Baan |
| 5,341,841 A | 8/1994 | Schaefer |
| 5,341,848 A | 8/1994 | Laws |
| 5,357,793 A | 10/1994 | Jouwsma |
| 5,379,650 A | 1/1995 | Kofoed et al. |
| 5,385,046 A | 1/1995 | Yamakawa et al. |
| 5,400,973 A | 3/1995 | Cohen |
| 5,404,753 A | 4/1995 | Hecht et al. |
| 5,481,925 A | 1/1996 | Woodbury |
| 5,535,633 A | 7/1996 | Kofoed et al. |
| 5,537,870 A | 7/1996 | Zurek et al. |
| 5,581,027 A | 12/1996 | Juntunen |
| 5,609,303 A | 3/1997 | Cohen |
| 5,634,592 A | 6/1997 | Campau |
| 5,717,145 A | 2/1998 | Yasuhara et al. |
| 5,735,267 A | 4/1998 | Tobia |
| 5,736,651 A | 4/1998 | Bowers |
| 5,741,968 A | 4/1998 | Arai |
| 5,750,892 A | 5/1998 | Huang et al. |
| 5,763,787 A | 6/1998 | Gravel et al. |
| 5,781,291 A | 7/1998 | So et al. |
| 5,789,660 A | 8/1998 | Kofoed et al. |
| 5,792,958 A | 8/1998 | Speldrich |
| 5,817,950 A | 10/1998 | Wiklund et al. |
| 5,829,685 A | 11/1998 | Cohen |
| 5,844,135 A | 12/1998 | Brammer et al. |
| 5,861,561 A | 1/1999 | Van Cleve et al. |
| 5,866,824 A | 2/1999 | Schieber |
| 5,942,694 A | 8/1999 | Robins et al. |
| 6,044,716 A | 4/2000 | Yamamoto |
| 6,119,730 A | 9/2000 | McMillan |
| 6,128,963 A | 10/2000 | Bromster |
| 6,142,014 A | 11/2000 | Rilling |
| 6,164,143 A | 12/2000 | Evans |
| 6,247,495 B1 | 6/2001 | Yamamoto et al. |
| 6,308,553 B1 | 10/2001 | Bonne et al. |
| 6,312,389 B1 | 11/2001 | Kofoed et al. |
| 6,322,247 B1 | 11/2001 | Bonne et al. |
| 6,526,822 B1 | 3/2003 | Maeda et al. |
| 6,527,385 B2 | 3/2003 | Koitabashi et al. |
| 6,543,449 B1 | 4/2003 | Woodring et al. |
| 6,553,808 B2 | 4/2003 | Bonne et al. |
| 6,561,021 B2 | 5/2003 | Uramachi et al. |
| 6,579,087 B1 | 6/2003 | Vrolijk |
| 6,591,674 B2 * | 7/2003 | Gehman et al. ............. 73/204.22 |
| 6,655,207 B1 * | 12/2003 | Speldrich et al. ............. 73/202.5 |
| 6,681,623 B2 | 1/2004 | Bonne et al. |
| 6,715,339 B2 | 4/2004 | Bonne et al. |
| 6,742,399 B2 | 6/2004 | Kunz et al. |
| 6,761,165 B2 | 7/2004 | Strickland, Jr. |
| 6,769,299 B2 | 8/2004 | Forster et al. |
| 6,779,393 B1 | 8/2004 | Muller et al. |
| 6,779,395 B2 | 8/2004 | Hornung et al. |
| 6,826,966 B1 | 12/2004 | Karbassi et al. |
| 6,871,534 B1 | 3/2005 | Hamada et al. |
| 6,871,537 B1 | 3/2005 | Gehman et al. |
| 6,886,401 B2 * | 5/2005 | Ito et al. ........................ 73/202 |
| 6,901,795 B2 | 6/2005 | Naguib et al. |
| 6,904,799 B2 | 6/2005 | Cohen et al. |
| 6,904,907 B2 | 6/2005 | Speldrich et al. |
| 6,907,787 B2 | 6/2005 | Cook et al. |
| 6,915,682 B2 | 7/2005 | Renninger et al. |
| 6,928,865 B2 * | 8/2005 | Ito et al. ..................... 73/204.21 |
| 6,957,586 B2 | 10/2005 | Sprague |
| 7,000,298 B2 | 2/2006 | Cook et al. |
| 7,000,612 B2 | 2/2006 | Jafari et al. |
| 7,028,560 B2 | 4/2006 | Castillon Levano |
| 7,032,463 B2 * | 4/2006 | Misholi et al. ............. 73/861.52 |
| 7,036,366 B2 * | 5/2006 | Emmert et al. ............. 73/202.5 |
| 7,043,978 B2 | 5/2006 | Goka et al. |
| 7,059,184 B2 | 6/2006 | Kanouda et al. |
| 7,100,454 B2 | 9/2006 | Hasunuma |
| 7,107,834 B2 | 9/2006 | Meneghinin et al. |
| 7,121,139 B2 | 10/2006 | Shajii et al. |
| 7,243,541 B1 | 7/2007 | Bey et al. |
| 7,258,003 B2 | 8/2007 | Padmanabhan et al. |
| 7,278,309 B2 | 10/2007 | Dmytriw et al. |
| 7,278,326 B2 | 10/2007 | Kobayashi et al. |
| 7,337,677 B2 | 3/2008 | Mizohata |
| 7,343,823 B2 | 3/2008 | Speldrich |
| 7,347,785 B2 | 3/2008 | Worman, Jr. et al. |
| 7,353,719 B2 | 4/2008 | Hiura et al. |
| 7,373,819 B2 | 5/2008 | Engler et al. |
| 7,386,166 B2 | 6/2008 | Curry et al. |
| 7,430,918 B2 | 10/2008 | Selvan et al. |
| 7,454,984 B1 | 11/2008 | Ross et al. |
| 7,464,611 B2 | 12/2008 | Matter et al. |
| 7,472,580 B2 | 1/2009 | Lyons et al. |
| 7,479,255 B2 | 1/2009 | Otani et al. |
| 7,513,149 B1 | 4/2009 | Ricks |
| 7,516,761 B2 | 4/2009 | Setescak |
| 7,520,051 B2 | 4/2009 | Becke et al. |
| 7,549,332 B2 | 6/2009 | Yamashita et al. |
| 7,568,383 B2 | 8/2009 | Colvin et al. |
| 7,603,898 B2 | 10/2009 | Speldrich |
| 7,631,562 B1 | 12/2009 | Speldrich |
| 7,647,835 B2 | 1/2010 | Speldrich |
| 7,654,157 B2 | 2/2010 | Speldrich |
| 7,661,303 B2 | 2/2010 | Kohno et al. |
| 7,698,938 B2 * | 4/2010 | Inagaki et al. ............. 73/204.22 |
| 7,698,958 B2 | 4/2010 | Matter et al. |
| 7,704,774 B2 | 4/2010 | Mayer et al. |
| 7,730,793 B2 | 6/2010 | Speldrich |
| 7,757,553 B2 | 7/2010 | Meier et al. |
| 7,793,410 B2 | 9/2010 | Padmanabhan et al. |
| 7,805,986 B2 | 10/2010 | Colvin et al. |
| 7,832,269 B2 | 11/2010 | Bey, Jr. et al. |

| | | | |
|---|---|---|---|
| 7,878,980 B2 | 2/2011 | Ricciardelli | |
| 7,891,238 B2 | 2/2011 | Becke et al. | |
| 7,892,488 B2 | 2/2011 | Speldrich et al. | |
| 8,113,046 B2 * | 2/2012 | Speldrich et al. | 73/204.22 |
| 2002/0078744 A1 | 6/2002 | Gehman et al. | |
| 2003/0062045 A1 | 4/2003 | Woodring et al. | |
| 2004/0118200 A1 | 6/2004 | Hornung et al. | |
| 2004/0163461 A1 * | 8/2004 | Ito et al. | 73/204.21 |
| 2004/0177703 A1 * | 9/2004 | Schumacher et al. | 73/861.52 |
| 2005/0016534 A1 | 1/2005 | Ost | |
| 2005/0039809 A1 | 2/2005 | Speldrich | |
| 2005/0235757 A1 * | 10/2005 | De Jonge et al. | 73/861.07 |
| 2005/0247106 A1 | 11/2005 | Speldrich et al. | |
| 2005/0247107 A1 | 11/2005 | Speldrich et al. | |
| 2006/0201247 A1 | 9/2006 | Speldrich et al. | |
| 2006/0225488 A1 | 10/2006 | Speldrich | |
| 2007/0176010 A1 | 8/2007 | Figi et al. | |
| 2007/0295068 A1 | 12/2007 | Kozawa et al. | |
| 2008/0163683 A1 | 7/2008 | Becke et al. | |
| 2008/0202929 A1 | 8/2008 | Chapples et al. | |
| 2009/0265144 A1 | 10/2009 | Speldrich | |
| 2010/0013165 A1 | 1/2010 | Speldrich et al. | |
| 2010/0101332 A1 | 4/2010 | Speldrich | |
| 2010/0154559 A1 | 6/2010 | Speldrich | |
| 2010/0269583 A1 * | 10/2010 | Jasnie | 73/198 |
| 2011/0226052 A1 * | 9/2011 | Speldrich et al. | 73/204.22 |
| 2011/0247411 A1 | 10/2011 | Speldrich | |
| 2012/0035866 A1 * | 2/2012 | Qasimi et al. | 702/47 |

FOREIGN PATENT DOCUMENTS

| | | |
|---|---|---|
| EP | 0094497 | 11/1983 |
| EP | 0255056 | 2/1988 |
| EP | 1655123 | 5/2006 |
| EP | 1691175 | 8/2006 |
| EP | 1959242 | 8/2008 |
| EP | 2068129 | 10/2009 |
| EP | 2157411 | 2/2010 |
| EP | 2199758 | 6/2010 |
| EP | 2270441 | 1/2011 |
| FR | 377743 | 3/1907 |
| GB | 2123564 | 2/1984 |
| JP | 49120131 | 11/1974 |
| JP | 58221119 | 12/1983 |
| JP | 3099230 | 4/1991 |
| JP | 4069521 | 3/1992 |
| JP | 7083713 | 3/1995 |
| JP | 10239130 | 9/1998 |
| JP | 10307047 | 11/1998 |
| WO | 9221940 | 12/1992 |
| WO | 9315373 | 8/1993 |
| WO | 9517651 | 6/1995 |
| WO | 0111322 | 2/2001 |
| WO | 0161282 | 8/2001 |
| WO | 0198736 | 12/2001 |
| WO | 2006131531 | 12/2006 |
| WO | 2007095528 | 8/2007 |
| WO | 2007137978 | 12/2007 |
| WO | 2008070603 | 6/2008 |

OTHER PUBLICATIONS

Honeywell, "Airflow Sensors Line Guide," 6 pages, Apr. 2010.
Honeywell, "Mass Airflow Sensors, AWM720P1 Airflow," 4 pages, prior to Mar. 22, 2010.
Honeywell, "Mass Airflow Sensors, AWM9000 Airflow," 6 pages, 2003.
Honeywell, "Reference and Application Data, Microbridge Airflow Sensors," 1 page, prior to Mar. 22, 2010.
"Schematic Cross-Section for AWM43600," 1 page, prior to Jan. 31, 2011.
Bodycote, "Competitive Teardown Analysis of Sensirion EMI," Bodycote Testing Group, 24 pages, Oct. 15, 2007.
U.S. Appl. No. 13/018,017, filed Jan. 31, 2011.
U.S. Appl. No. 13/018,037, filed Jan. 31, 2011.
U.S. Appl. No. 13/361,764, filed Jan. 30, 2012.
Honeywell, "Airflow Sensors Line Guide," 6 pages, Nov. 2010.
Honeywell, "Airflow, Force and Pressure Sensors," Product Range Guide, 20 pages, Mar. 2011.
Honeywell, "AWM43600V, Issue No. 4," 1 page, Jul. 29, 1996.
Honeywell, "AWM43600V, Part No. SS12177," 1 page, Jul. 10, 1998.
Honeywell, "Housing, Flowtube, Drawing 50005182," 1 page, Sep. 2, 2004.
Honeywell, "Housing, Plastic, Drawing 050.1.156," 1 page, Jul. 8, 1998.
Honeywell, "Housing, Subassembly, Drawing SS-12148," 1 page, Oct. 14, 1998.
Honeywell, "Sensing and Control Interactive Catalog," 4 pages, prior to Mar. 22, 2010.
Honeywell, "Tubing, Plastic, Drawing SS-12062," 1 page, Apr. 5, 1999.
Honeywell, "Tubing, Plastic, Drawing SS-12160," 1 page, drawn Jan. 28, 1998.
Search Report for corresponding United Kingdom application Serial No. GB1104000.3, Jul. 2011.

* cited by examiner

FLOW SENSOR ASSEMBLY WITH POROUS INSERT

RELATED APPLICATION

This application is related to U.S. application Ser. No. 12/729,173, entitled "SENSOR ASSEMBLY WITH HYDROPHOBIC FILTER", filed on the even date herewith, which is hereby incorporated by reference.

FIELD

The present disclosure relates generally to flow sensors, and more particularly, to methods and devices for reducing variations in fluid flow across a flow sensor for increased accuracy and/or reliability.

BACKGROUND

Flow sensors are often used to sense the flow rate of a fluid (e.g. gas or liquid) traveling through a fluid channel. Such flow sensors are often used in a wide variety of applications including, for example, medical applications, flight control applications, industrial process applications, combustion control applications, weather monitoring applications, as well as many others. In some instances, the fluid flow entering the flow sensor may be turbulent, which can result in increased noise in the flow sensor output signal. This noise can affect the accuracy, repeatability and/or reproducibility of the measurement of the flow sensor.

SUMMARY

The present disclosure relates generally to flow sensors, and more particularly, to methods and devices for reducing variations in fluid flow across the flow sensor for increased accuracy and/or reliability. In one illustrative embodiment, a flow sensor assembly includes a housing with an inlet flow port and an outlet flow port. The housing may define a fluid channel extending between the inlet flow port and the outlet flow port, with a flow sensor positioned in the housing exposed to the fluid channel. The flow sensor may sense a measure related to the flow rate of a fluid flowing through the fluid channel. A porous insert may be situated in the fluid channel, sometimes upstream of the flow sensor. When so configured, and during operation of the flow sensor assembly, a fluid may pass through the inlet flow port, through the porous insert, across the flow sensor, and through the outlet flow port. The porous insert may include pores that are configured to reduce the turbulence in the fluid passing the flow sensor. In some instances, the pores of the porous insert(s) may be configured o help laminarize the fluid flow past the flow sensor. In some cases, the one or more porous inserts may be configured to provide a predetermined pressure drop of the fluid flowing through the fluid channel of the housing at a given flow rate.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DESCRIPTION

Figure 1:
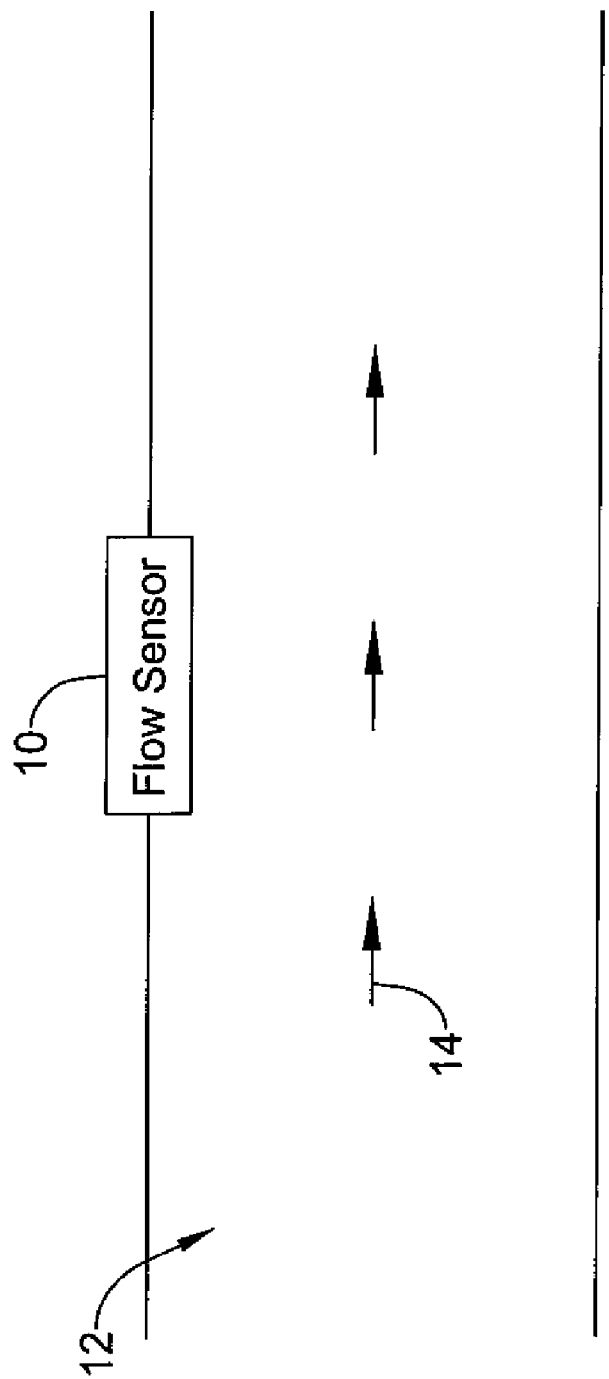
FIG. 1 is a schematic diagram of an illustrative flow sensor for measuring a fluid flow rate of a fluid passing through a fluid channel.

The following description should be read with reference to the drawings wherein like reference numerals indicate like elements throughout the several views. The description and drawings show several embodiments which are meant to be illustrative of the claimed disclosure.

FIG. 1 is a schematic diagram of an illustrative flow sensor 10 for measuring a fluid flow rate of a fluid flow 14 passing through a fluid channel 12. The term "fluid" as used herein can refer to a gas flow or a liquid flow, depending on the application. In the illustrative embodiment, the flow sensor 10 may be exposed to and/or disposed in the fluid channel 12 to measure one or more properties of the fluid flow 14. For example, the flow sensor 10 may measure the mass flow and/or velocity of the fluid flow 14 using one or more thermal sensors (e.g. see FIG. 2), pressure sensors, acoustical sensors, optical sensors, pitot tubes, and/or any other suitable sensor or sensor combination, as desired. In some cases, the flow sensor 10 may be a microbridge or a Microbrick™ sensor assembly available from the assignee of the present application, but this is not required. Some illustrative methods and sensor configurations that are considered suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensor 10 may include any of these flow sensor configurations and methods, as desired. It must be recognized, however, that flow sensor 10 may be any suitable flow sensor, as desired.

In the illustrative example, the fluid channel 12 may experience a range of flow rates of fluid flow 14. For example, the fluid channel 12 may include a high-volume fluid flow, a mid-volume fluid flow, or a low-volume fluid flow. Example fluid flow applications can include, but are not limited to, respirometers, flow meters, velocimeters, flight control, industrial process stream, combustion control, weather monitoring, as well as any other suitable fluid flow applications, as desired.

Figure 2:
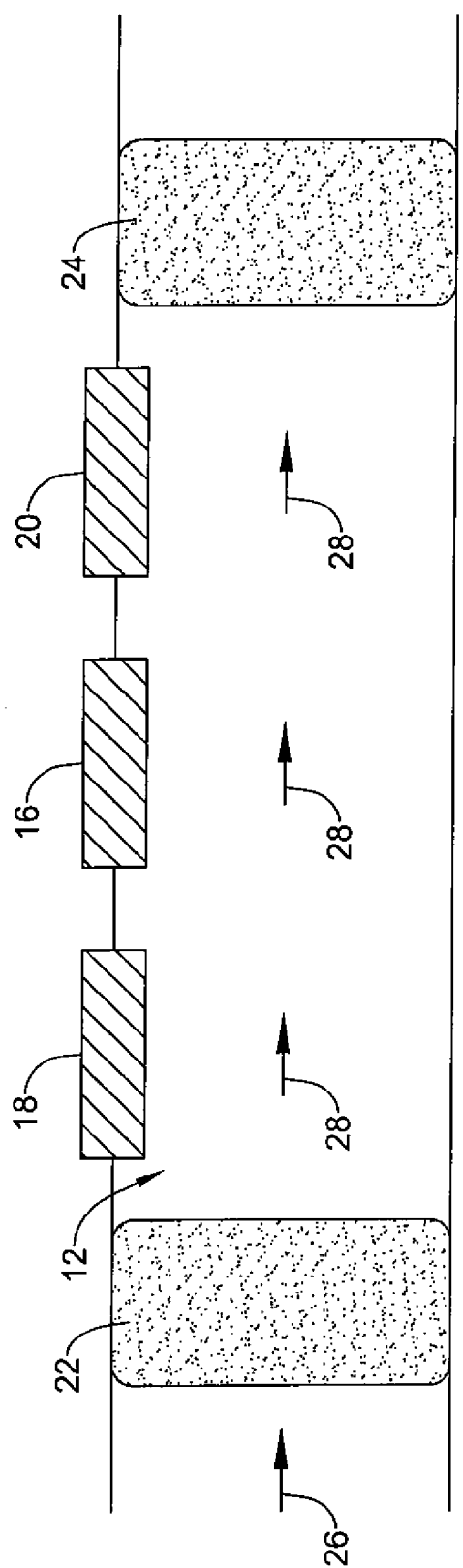
FIG. 2 is a schematic diagram of an illustrative thermal flow sensor assembly useful for measuring the flow rate of a fluid passing through a fluid channel.

Turning now to FIG. 2, which is a schematic diagram of an illustrative thermal flow sensor assembly for measuring the flow rate of a fluid flow 14 passing through a fluid channel 12. In the illustrative embodiment, the flow sensor assembly may include one or more heater elements, such as heater element 16, and one or more sensor elements 18 and 20, for sensing a flow rate of a fluid 28 in the fluid channel 12.

As illustrated in FIG. 2, the flow sensor assembly may also include one or more porous inserts 22 and 24 positioned in the fluid channel 12 upstream and/or downstream of the heater element 16 and one or more sensor elements 18 and 20. The porous insert(s) 22 and/or 24 may include a plurality of pores that are configured to reduce the turbulence in the fluid passing the flow sensor. In some instances, the pores of the porous insert(s) 22 and/or 24 may be configured to help laminarize the fluid flow in the fluid channel 12 past the flow sensor. In some cases, the one or more porous insert(s) 22 and/or 24 may be configured to provide a predetermined pressure drop of the fluid flowing through the fluid channel 12 of the housing at a given flow rate.

In some instances the porous insert(s) 22 and/or 24 may cause a more consistent flow of fluid past the flow sensor. The consistent flow of fluid through the plurality of pores can cause the flow to be laminar and mitigate turbulent effects of flow as the fluid passes the flow sensor. In some cases, the laminar flow can reduce the noise seen by the flow sensor assembly, providing a more consistent, reliable, repeatable, and stable output of the flow sensor assembly.

As illustrated in FIG. 2, the flow sensor assembly may include a heater element 16, a first sensor element 18 positioned upstream of the heater element 16, and a second sensor element 20 positioned downstream of the heater element 16. While the first sensor element 18 is shown as upstream of the heater element 16, and the second sensor element 20 is shown as downstream of the heater element 16, this is not meant to be limiting. It is contemplated that, in some embodiments, the fluid channel 12 may be a bi-directional fluid channel such that, in some cases, the first sensor element 18 is downstream of the heater element 16 and the second sensor element 20 is upstream of the heater element 16. In some instances only one sensor element may be provided, and in other embodiments, three or more sensor elements are provided. In some instances, both sensor elements 18 and 20 may be positioned upstream (or downstream) of the heater element 16.

In some cases, the first sensor element 18 and the second sensor element 20 may be thermally sensitive resistors that have a relatively large positive or negative temperature coefficient, such that the resistance varies with temperature. In some cases, the first and second sensing elements 18 and 20 may be thermistors. In some instances, the first sensor element 18, the second sensor element 20, and any additional sensor elements may be arranged in a Wheatstone bridge configuration, but this is not required in all embodiments.

In the example shown, when no fluid flow is present in the fluid channel 12 and the heater element 16 is heated to a temperature higher than the ambient temperature of the fluid in the fluid flow 28, a temperature distribution may be created and transmitted in a generally symmetrical distribution about the heater element 16 to upstream sensor element 18 and downstream sensor element 20. In this example, upstream sensor element 18 and downstream sensor element 20 may sense the same or similar temperature (e.g. within 25 percent, 10 percent, 5 percent, 1 percent, 0.001 percent, etc.). In some cases, this may produce the same or similar output voltage in the first sensor element 18 and the second sensor element 20.

When a fluid flow 28 is present in the fluid channel 12 and the heater element 16 is heated to a temperature higher than the ambient temperature of the fluid in the fluid flow 28, the symmetrical temperature distribution may be disturbed and the amount of disturbance may be related to the flow rate of the fluid flow 28 in the fluid channel 12. The flow rate of the fluid flow 28 may cause the upstream sensor element 18 to sense a relatively cooler temperature than the downstream sensor element 20. In other words, the flow rate of the fluid flow 28 may cause a temperature differential between the upstream sensor element 18 and the downstream sensor element 20 that is related to the flow rate of the fluid flow 28 in the fluid channel 12. The temperature differential between the upstream sensor element 18 and the downstream sensor element 20 may result in an output voltage differential between the upstream sensor element 18 and the downstream sensor element 20.

In another illustrative embodiment, the mass flow and/or velocity of the fluid flow 28 may be determined by providing a transient elevated temperature condition in the heater element 16, which in turn, causes a transient elevated temperature condition (e.g. heat pulse) in the fluid flow 28. When there is a non-zero flow rate in the fluid flow 28, the upstream sensor element 18 may receive a transient response later than the downstream sensor element 20. The flow rate of the fluid flow 28 can then be computed using the time lag between the upstream sensor element 18 and downstream sensor element 20, or between the time the heater is energized and when the corresponding elevated temperature condition (e.g. heat pulse) is sensed by one of the sensors, such as the downstream sensor 20.

In the illustrative embodiment, the one or more porous inserts 22 and 24 may provide a laminar fluid flow 28 across the heater element 16 and sensing elements 18 and 20. For example, in some cases, a relatively unstable or turbulent fluid flow 26 may enter the fluid channel 12 and the one or more porous inserts 22 and 24 may help laminarize fluid flow 28 across heater element 16 and sensing elements 18 and 20. The pressure drop due to porous inserts 22 and 24 may be dependant upon the density and length of the porous inserts 22 and 24. In some embodiments, the porous inserts 22 and 24 can have a porous structure with pore sizes in the range of microns to millimeters depending on the desired pressure drop and other factors, as desired. In some embodiments, the porous inserts 22 and 24 can have lengths of less than one inch, one inch, or greater than one inch, depending on the desired pressure drop, pore size, and other factors. In some cases, the porous inserts 22 and 24 can have the same pore size and length or, in other cases, can have different pore sizes and lengths, as desired.

As illustrated, porous insert 22 is positioned in the fluid channel 12 upstream of the heater element 16 and one or more sensor elements 18 and 20, and porous insert 24 is positioned in the fluid channel 12 downstream of the heater element 16 and one or more sensor elements 18 and 20. In some embodiments, however, it is contemplated that only one porous insert 22 or 24 may be provide in the fluid channel 12. For example, only porous insert 22 or only porous insert 24 may be provided in the fluid channel 12. It is contemplated that only an upstream porous insert may be used, only a downstream porous insert may be used, or that multiple upstream and/or downstream porous inserts may be used, as desired. For example, in a uni-directional sensor, upstream porous insert 22 may serve to laminarize the fluid flow, however, in a bi-directional flow sensor, either upstream porous insert 22 or downstream porous insert 24 may serve to laminarize the fluid flow, depending on the direction of the flow.

In some embodiments, the porous inserts 22 and 24 may include suitable porous materials, such as, for example, porous polymer and/or porous fiber material (e.g. sintered polymer particulates), foams (e.g. reticulated foams, open-cell foams), woven fibers (e.g. precision woven mesh), non-woven fibers (e.g. felt), polyurethane, polytetraflouride (PTFE), polyethylene (PE), nylon, polyethylene terephthalate (PET), polybutylene terephthalate (PBT), polypropylene (PP), and/or any other material that, for example, helps laminarize and/or causes a desired pressure drop in a fluid flowing through the flow channel 12. The porous polymer material may include, for example, thermoset polymers, thermoplastic polymers, elastomer materials, organic or synthetic materials, and any other suitable polymer material, as desired. Example porous materials include POREX porous polymer materials and POREX fiber media available from POREX Technologies. Other porous materials are UHMW Polyethylene or PE copolymers available from GenPore. An example of a precision woven mesh is Sefar Tetex® DLW available from Sefar Filtration Incorporated. An example of non woven fiber material is Gore Acoustic filter GAW102 available from W.L Gore & Associates.

It is to be understood that the illustrative heater element 16 and sensing elements 18 and 20 are merely illustrative and, in some embodiments, may not be present, as desired. For example, it is contemplated that the porous inserts 22 and 24 may be incorporated into one or more pressure sensors, acoustical sensors, optical sensors, pitot tubes, and/or any other suitable sensor or sensor combination that may be used to sense a measure related to a fluid flow in fluid channel 12, as desired.

Figure 3:
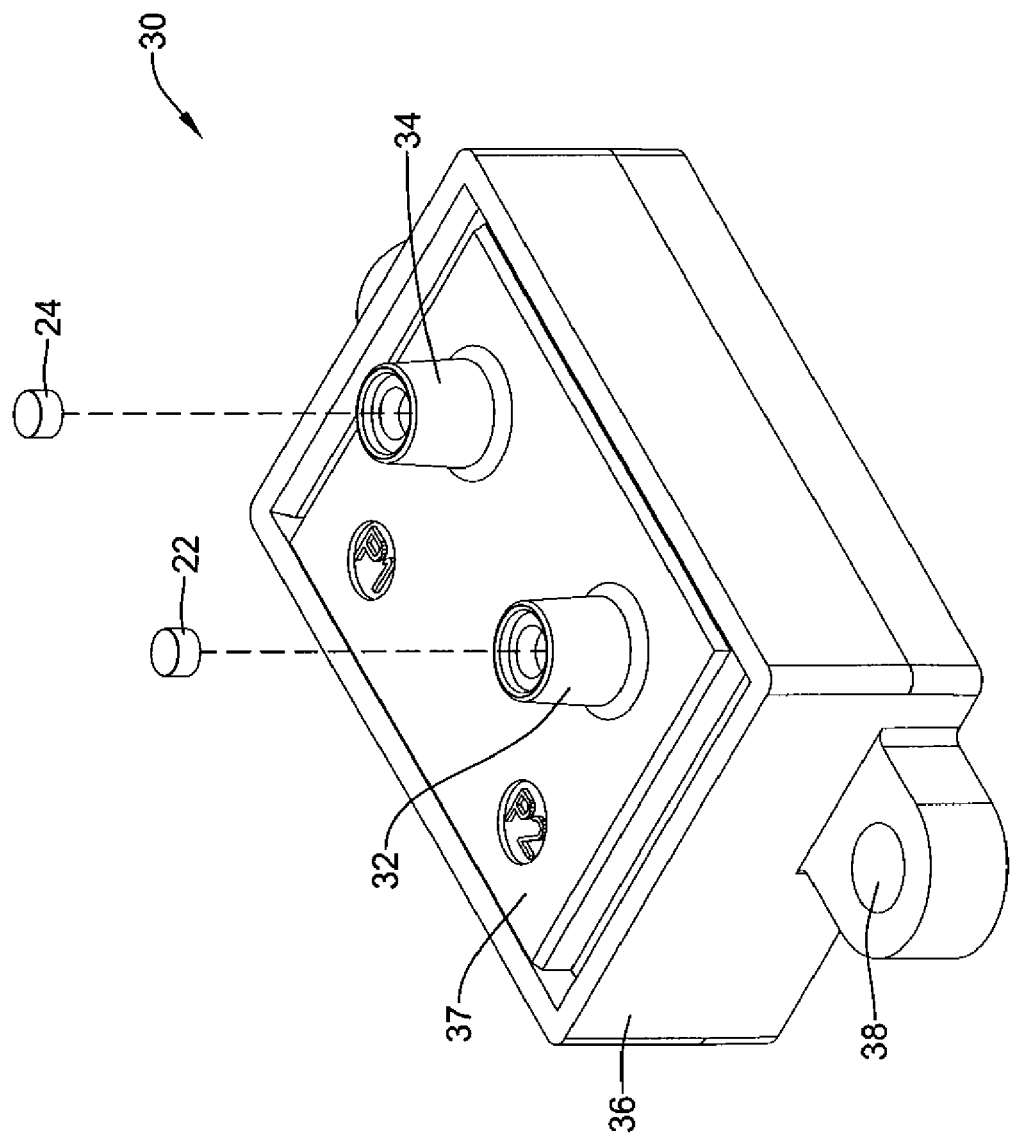
FIG. 3 is a partially exploded perspective view of an illustrative flow sensor assembly that includes one or more porous inserts.

FIG. 3 is a partially exploded perspective view of an illustrative flow sensor assembly 30 that includes one or more porous inserts 22 and/or 24. In the illustrative embodiment, the flow sensor assembly 30 includes an outer protective housing including a top protective cover 37 and a bottom protective cover 36. As illustrated, the top protective cover 37 may be inserted into a recess of the bottom protective cover 36. With such a configuration, the top and bottom protective covers 37 and 36 may protect the flow sensing element (shown as 42 in FIG. 4) and any signal conditioning circuitry that may be provided in the housing. In some cases, the top protective cover 37 and the bottom protective cover 36 may be formed from, for example, plastic. However, it is contemplated that any other suitable material may be used, as desired.

In the illustrative embodiment, the outer protective housing including the top protective cover 37 and the bottom protective cover 36 are formed as a composite. However, it is contemplated that the outer protective housing can be molded in a single piece from a plastic or other suitable material according to design considerations. For example, it is contemplated that the outer protective housing may be formed by injection molding or made by other suitable methods and materials, as desired.

As illustrated in FIG. 3, the top protective cover 37 of the housing includes a first flow port 32 and a second flow port 34, which a flow channel extending therebetween. The flow sensing element is exposed to the fluid in the flow channel. In some cases, flow port 32 may be an inlet flow port, and flow port 34 may be an outlet flow port, but this is not required. In some cases, it is contemplated that the flow sensor assembly 30 may be a bi-directional flow sensor assembly and, in this case, either flow port 32 or flow port 34 may serve as the inlet flow port or the outlet flow port, depending on the current direction of the fluid flow through the flow channel.

Although not shown in FIG. 3, the flow sensor assembly 30 may include one or more electrical leads (shown as 44 in FIG. 4) electrically connected to the flow sensing element 42 and extending external of the outer protective housing. In some cases, the one or more electrical leads 44 may include a metal, however, any suitable conducting material may be used, as desired.

In some embodiments, the outer protective housing may also include one or more mounting holes 38. As illustrated, bottom protective housing 36 includes two mounting holes 38, but any suitable number of mounting holes may be used, as desired. The mounting holes 38 may be configured to receive a fastener, such as a screw, bolt, or nail, to mount the bottom protective cover 36 to a desired surface to accommodate the particular equipment for which the flow sensor assembly 30 may be used. It is contemplated that bottom protective cover 36 or the top protective cover 37 may include additional mounting holes 38 or no mounting holes 38, as desired.

In the illustrative embodiment, porous insert 22 may be inserted, pressed, or otherwise positioned in or adjacent to flow port 32. Porous insert 24 may be inserted, pressed, or otherwise positioned in or adjacent to flow port 34. In some embodiments, the porous inserts 22 and 24 may be generally cylindrical in shape. However, it is contemplated that any suitable shape may be used, depending on the shape of the port that the insert is to be inserted. In other cases, it is contemplated that the porous inserts 22 and 24 may be any shape and, when inserted in the flow ports 32 and 34, the porous inserts 22 and 24 may be deformable to accommodate the shape of the flow ports 32 and 34.

The porous inserts 22 and 24 can be configured to have a length and/or density that will produce a desired or predetermined pressure drop along the fluid channel at a given flow rate. For example, increasing the length and/or increasing density of the porous inserts 22 and 24 (e.g. reducing the pore size) may increase the pressure drop through the flow channel, whereas decreasing the length and/or decreasing the density of the porous inserts 22 and 24 may decrease the pressure drop. In some cases, increasing the density of upstream porous insert 22 (e.g. reducing the pore size) and/or providing relatively uniform pore sizes may help to provide a more laminar fluid flow. It is contemplated that any suitable length and/or density may be used for the porous inserts 22 and 24, depending on the desired pressure drop and/or laminarization of the fluid flow in the flow channel.

Figure 4:
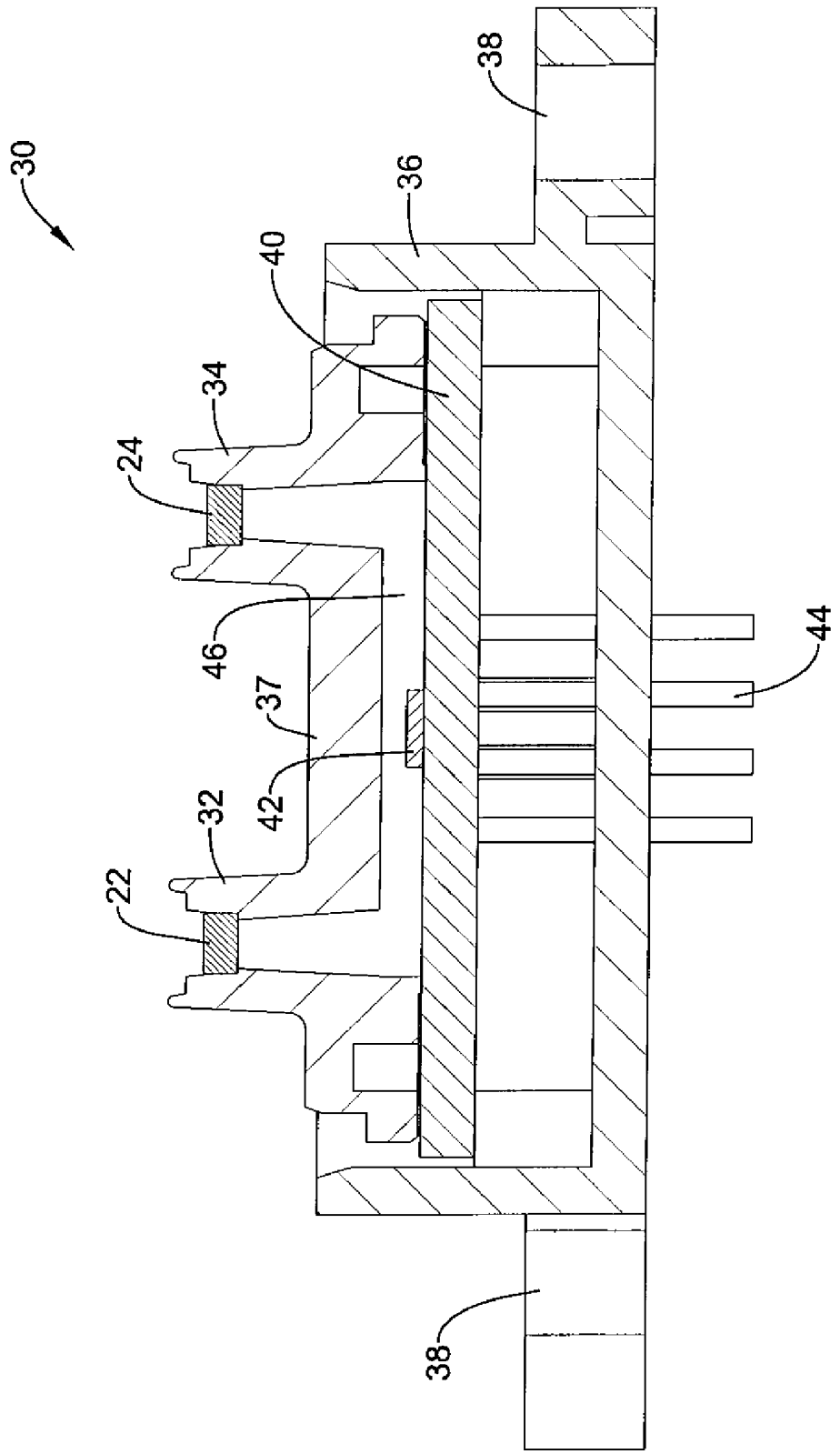
FIG. 4 is a cross-sectional view of the illustrative flow sensor assembly of FIG. 3 including porous inserts in both inlet and outlet flow ports.
Figure 5:
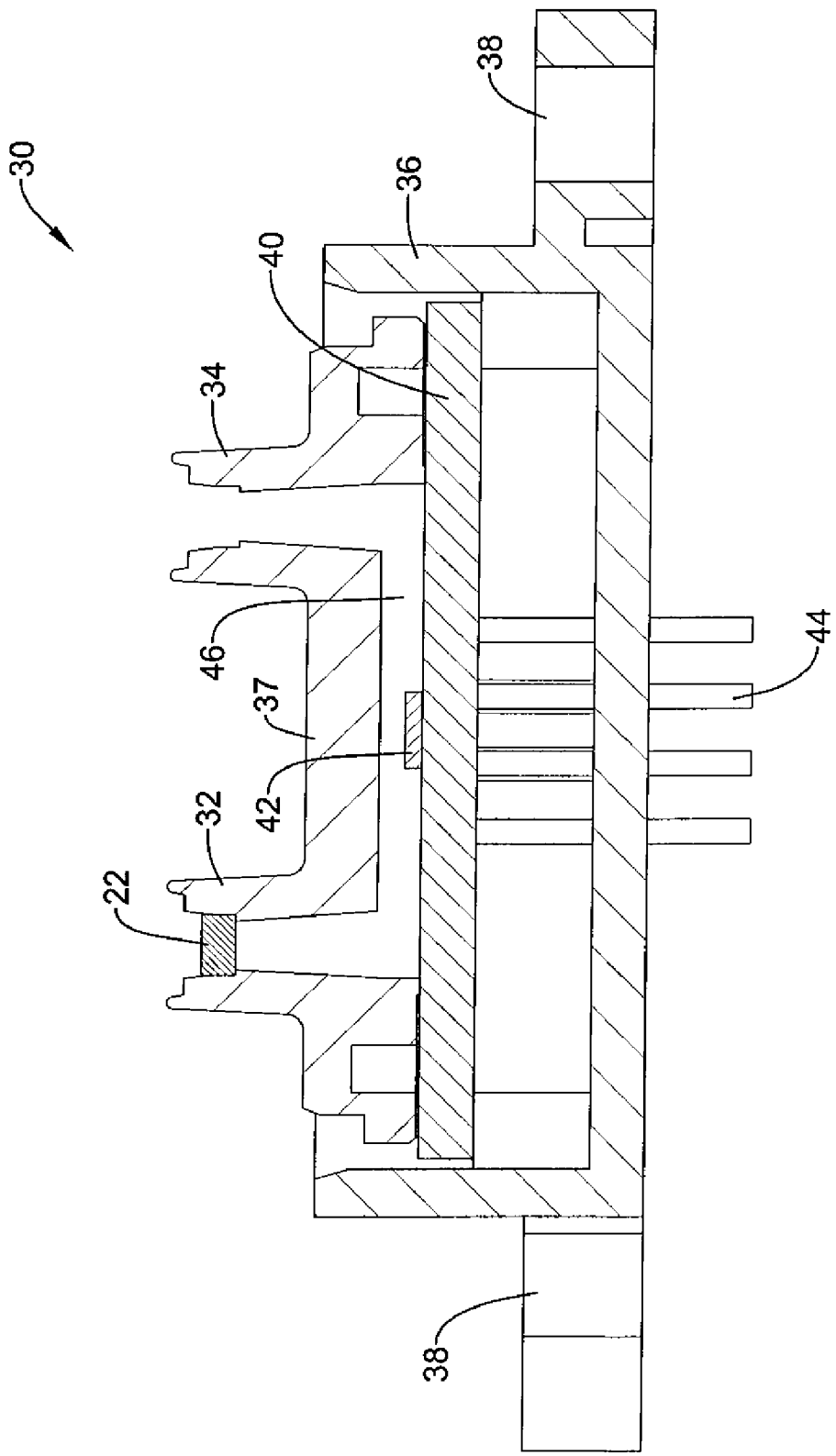
FIGS. 5 and 6 are cross-sectional views of the illustrative flow sensor assembly of FIG. 3 including porous inserts in only one of the inlet and outlet flow ports.
Figure 6:
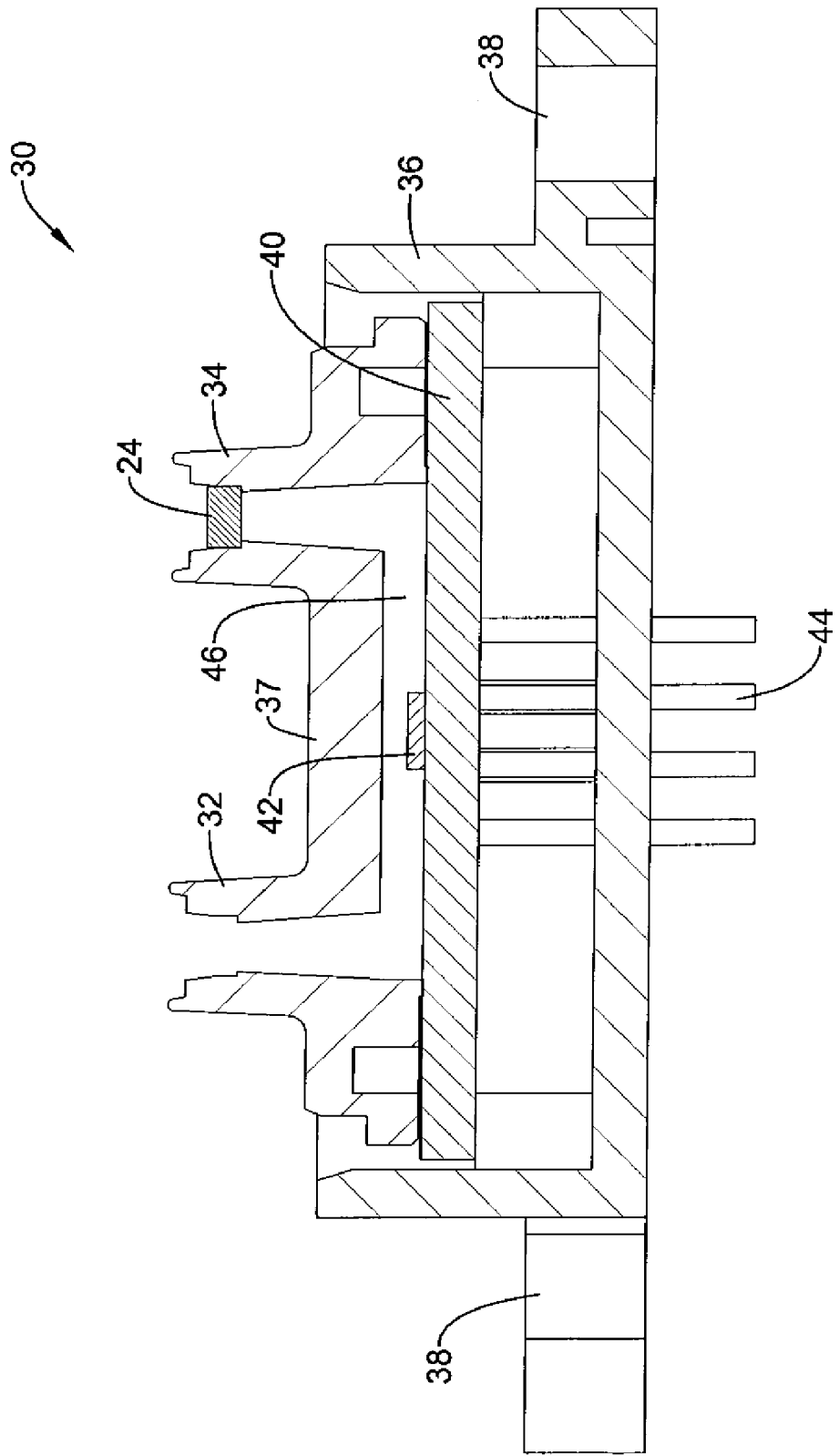

FIGS. 4-6 are cross-sectional views of the flow sensor assembly 30 of FIG. 3. In the illustrative embodiment of FIG. 4, the flow sensor assembly 30 may include a flow sensing element 42 mounted on a package substrate 40. The flow sensing element 42 may be configured to sense a measure related to flow rate of a fluid flowing through in flow channel 46. The package substrate 40 may include a ceramic material, however, other suitable types of material may be used, as desired.

In the illustrative embodiment, the housing of the flow sensor assembly 30 may include a top housing cover 37 and a bottom housing cover 36. As shown in FIGS. 4-6, the top housing cover 37 and bottom housing cover 36 may define a cavity for receiving package substrate 40 with the flow sensing element 42 mounted thereon. In the illustrative embodiment, an upper surface of the package substrate 40, which includes the flow sensing element 42, and an inner surface of the top housing cover 37 may define flow channel 46 of the flow sensor assembly 30. The flow channel 46 may extend from flow port 32 of the top housing cover 37, along the flow sensing element 42, and to flow port 34 of the top housing cover 37. The flow channel 46 may expose the flow sensing element 42 to a fluid flow.

As illustrated in FIG. 4, the flow sensor assembly 30 may include porous insert 22 disposed in flow port 32 and/or porous insert 24 disposed in flow port 34. The porous inserts 22 and 24 may help laminarize the fluid flow, and/or control the pressure drop, across flow sensing element 42. As illustrated in FIGS. 5 and 6, only one porous insert 22 and 24 is provided. As shown in FIG. 5, porous insert 22 is provided in flow port 32 without any porous insert provided in flow port 34. As shown in FIG. 6, porous insert is provided in flow port 34 without any porous insert in flow port 32. While only one porous insert 22 or 24 is shown in the embodiments of FIGS. 5 and 6, the flow sensor assembly may still provide a laminar flow and/or a controlled pressure drop across the flow sensing element 42.

While porous inserts 22 and 24 are shown inserted into their respective flow ports 32 and 34, this is not meant to be limiting. It is contemplated that porous inserts 22 and 24 may be mounted over or provided adjacent to their respective flow ports 32 and 34. Further, it is contemplated that the porous inserts 22 and 24 can be provided in any suitable position to, for example, help laminarize the fluid flow and/or control the pressure drop in the fluid flow, as desired. For example, porous inserts 22 and 24 may be provided in the flow channel 46 between the package substrate 40 and inner surface of the top housing cover 37, if desired.

In the illustrative embodiment, flow sensor assembly 30 may include one or more electrical leads 44 mounted to the package substrate 40. The one or more electrical leads 44 may be configured to receive a signal transmitted from the flow sensing element 42 corresponding to the sensed flow rate of a fluid flowing through flow channel 42, via one or more traces provided on the package substrate 40. In some cases, the one or more electrical leads 44 may include a metal, however, any suitable conductive material may be used, as desired.

Figure 7:
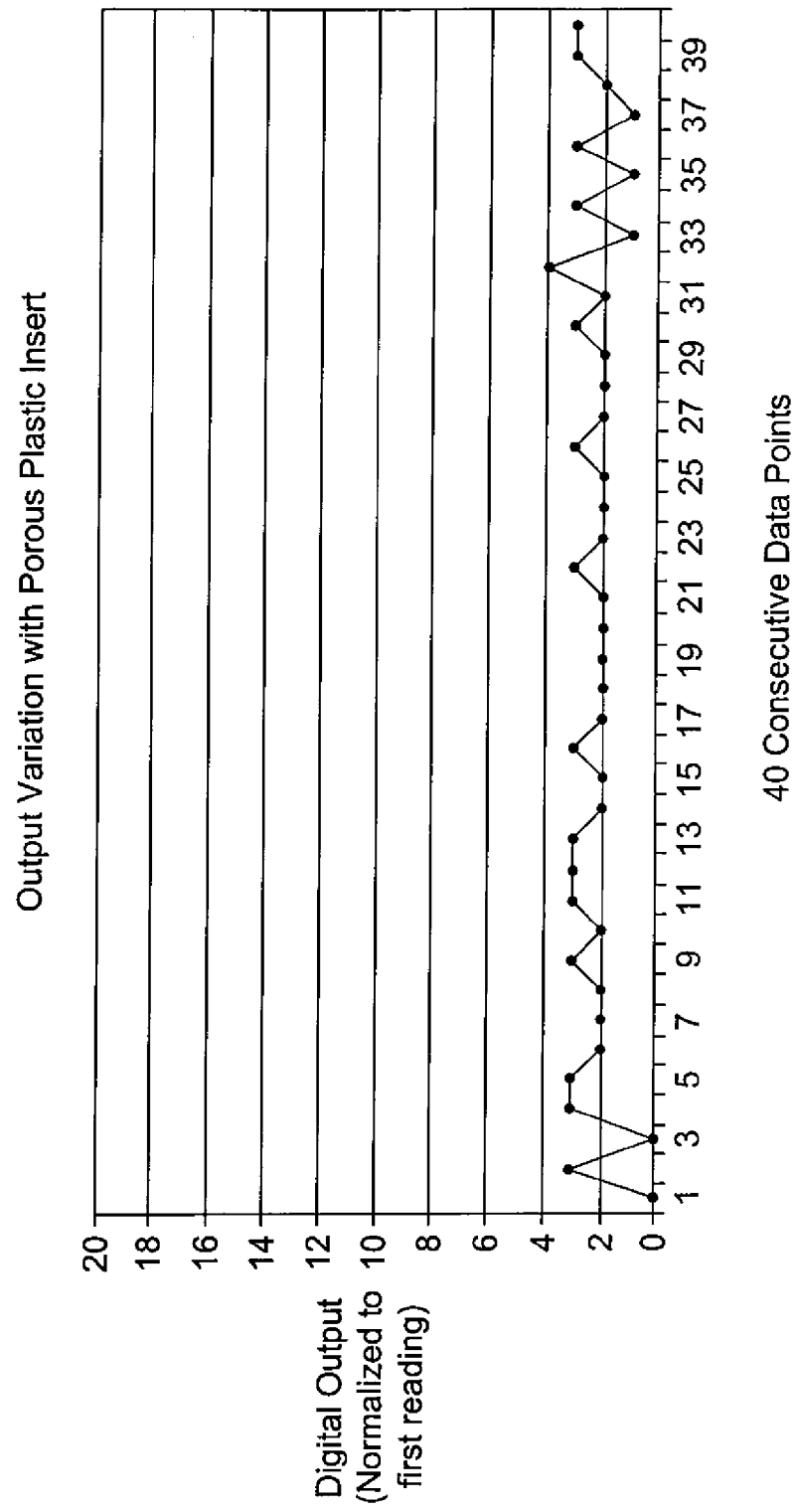
FIG. 7 is a graph showing output variations of a flow sensor with porous inserts.

FIG. 7 is a graph showing output variations of an illustrative flow sensor having porous inserts in the flow ports. In the illustrative example, the porous inserts may include a polyethylene material having a pore size of 45 pores per inch (PPI) and a length of about 6.35 millimeters (0.25 inches). As illustrated, the graph shows forty consecutive data points or readings from a digital output of the flow sensor having a fluid flow of 1000 standard cubic centimeters per minute (sccm). In the illustrative example, the digital output is measure in "counts", where there are 6.55 counts per sccm. The data points or readings from the flow sensor can be obtained at 1 millisecond intervals. To help illustrate the variations in the digital output of the flow sensor, the digital output is normalized to the first reading. As shown in FIG. 7, with the porous inserts in the flow ports of the flow sensor, the variations in the digital output ranges from 0 to 4 counts.

Figure 8:
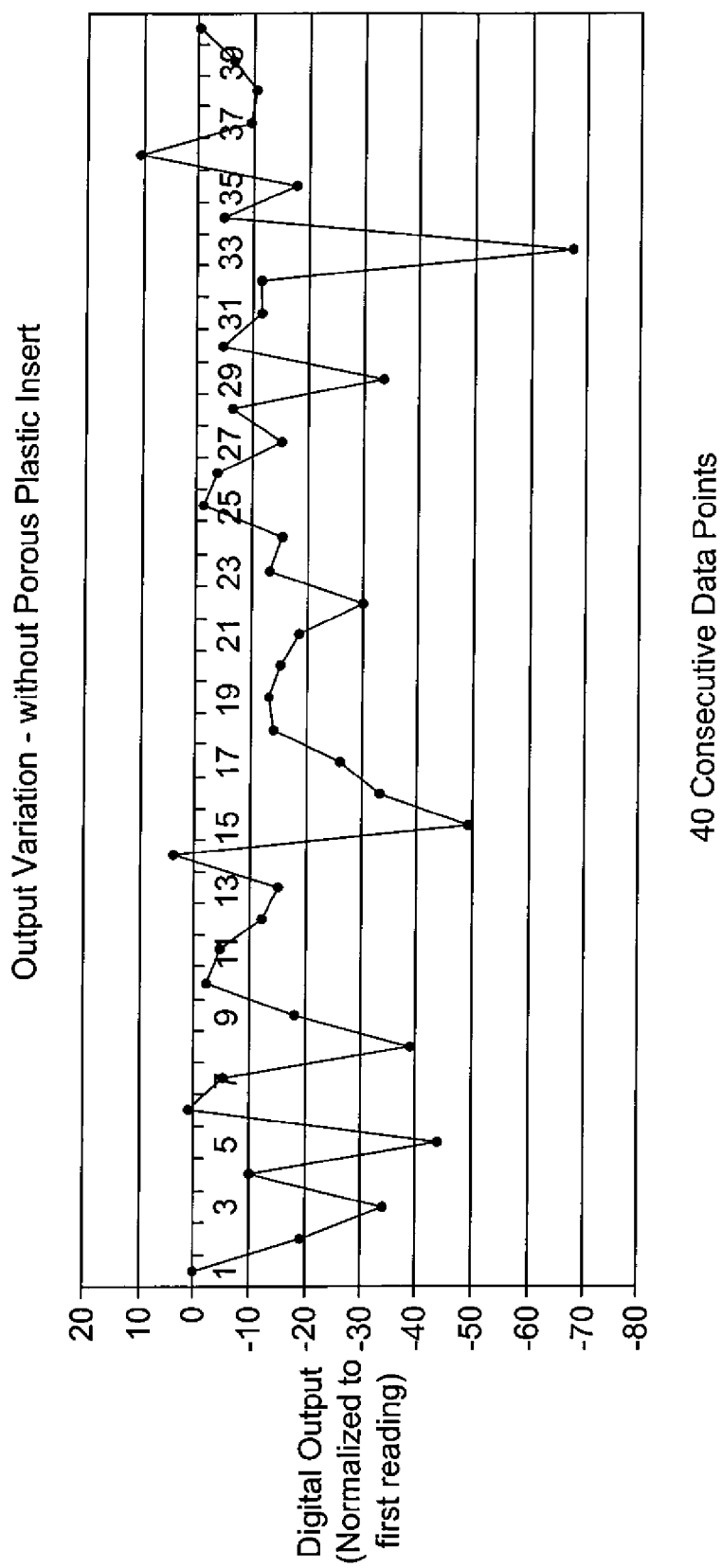
FIG. 8 is a graph showing output variations of a flow sensor without porous inserts.

FIG. 8 shows a graph of the output variations of the illustrative flow sensor used in FIG. 7 without porous inserts in the flow ports. Similar to the graph shown in FIG. 7, the graph shows forty consecutive data points or readings from a digital output of the flow sensor having a fluid flow of 1000 sccm with the data points or readings taken at 1 millisecond intervals. Without the porous inserts, the variation in the digital output (normalized to the first reading) ranges from about −68 counts to about 12 counts. Comparing the graphs shown in FIGS. 7 and 8, the digital output of the graph shown in FIG. 7, with porous inserts, shows fewer variations and less noise in the digital output. The reduced number of variations and noise in the digital output may be due, at least in part, to the porous inserts providing a more laminar and less turbulent fluid flow through the flow sensor used for the graph of FIG. 7 as compared to the flow sensor without porous inserts used for the graph of FIG. 8.

While the foregoing description has been described with reference to a porous inserts 22 and 24, it is contemplated that any suitable insert, porous or not, that allows a fluid to flow therethrough and that decreases the instability in the fluid flow may be used, as desired.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensor assembly, comprising:
a housing including an inlet flow port and an outlet flow port, the housing defining a fluid channel extending between the inlet flow port and the outlet flow port;
a flow sensor positioned in the housing and exposed to the fluid channel, the flow sensor configured to sense a measure related to a flow rate of a fluid flowing through the fluid channel; and
an upstream porous foam insert situated in the fluid channel of the housing upstream of the flow sensor, wherein the upstream porous foam insert includes a polymer material having pores distributed therein to form a plurality of circuitous paths through the upstream porous foam insert, wherein during operation of the flow sensor assembly, a fluid passes through the inlet flow port, through the upstream porous foam insert, across the flow sensor, and through the outlet flow port, wherein the plurality of circuitous paths through the upstream porous foam insert are configured to enhance a laminar flow profile of the fluid across the flow sensor.

2. The flow sensor assembly of claim 1, wherein the flow sensor includes a heater element, a first sensing element positioned upstream of the heating element, and a second sensing element positioned downstream of the heating element.

3. The flow sensor assembly of claim 1, wherein the flow sensor is a pressure based flow sensor.

4. The flow sensor assembly of claim 1, wherein the upstream porous foam insert is configured to provide a predetermined pressure drop through the flow channel at a given flow rate.

5. The flow sensor assembly of claim 1 further comprising a downstream porous foam insert situated in the fluid channel of the housing downstream of the flow sensor, wherein the downstream porous foam insert includes a polymer material.

6. The flow sensor assembly of claim 5, wherein the upstream porous foam insert is positioned adjacent the inlet flow port and the downstream porous foam insert is positioned adjacent the outlet flow port.

7. A flow sensor assembly, comprising:
a housing including an inlet flow port and an outlet flow port, the housing defining a fluid channel extending between the inlet flow port and the outlet flow port;
a flow sensor situated in the housing and exposed to the fluid channel, the flow sensor configured to sense a measure related to a flow rate of a fluid flowing through the fluid channel;
an upstream porous polymer foam insert situated in the fluid channel of the housing upstream of the flow sensor;
a downstream porous polymer foam insert situated in the fluid channel of the housing downstream of the flow sensor; and
wherein during operation of the flow sensor assembly, a fluid passes through the inlet flow port, through the upstream porous polymer foam insert, across the flow sensor, through the downstream porous polymer foam insert, and through the outlet flow port, the upstream porous polymer foam insert including a plurality of pores distributed to form a plurality of circuitous paths through the upstream porous polymer foam insert and are configured to enhance a laminar flow profile of the fluid across the flow sensor.

8. The flow sensor assembly of claim 7, wherein the upstream porous polymer foam insert and the downstream porous polymer foam insert cause a predetermined pressure drop across the fluid channel at a given flow rate.

9. The flow sensor assembly of claim 7, wherein the flow sensor includes a heater element and one or more sensors elements each exposed to the fluid in the fluid channel.

10. The flow sensor assembly of claim 7, wherein the flow sensor is a pressure based flow sensor.

11. A method of reducing variations in a fluid flow through a flow sensor, the method comprising:
   providing a flow sensor assembly, the flow sensor assembly including:
   a housing including a first flow port and a second flow port, the housing defining a fluid channel extending between the first flow port and the second flow port;
   a flow sensor exposed to the fluid channel, the flow sensor configured to detect a measure related a flow rate of a fluid flowing through the fluid channel;
   inserting a first foam insert into the fluid channel upstream of the flow sensor, the first foam insert including a plurality of pores that are distributed to form a plurality of circuitous paths through the first insert and sized to reduce variations in a fluid flow profile across the flow sensor.

12. The method of claim 11, further comprising inserting a second foam insert into the fluid channel downstream of the flow sensor.

13. The method of claim 12, wherein the first foam insert and the second foam insert produce a predetermined pressure drop between the first flow port and the second flow port at a given fluid flow rate.

\* \* \* \* \*